(12) United States Patent
Iwai et al.

(10) Patent No.: US 11,639,799 B2
(45) Date of Patent: May 2, 2023

(54) HOT WATER SUPPLY DEVICE

(71) Applicant: NORITZ CORPORATION, Hyogo (JP)

(72) Inventors: Keisuke Iwai, Hyogo (JP); Kazuhiro Nishimura, Hyogo (JP); Masahiro Iguchi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 228 days.

(21) Appl. No.: 17/124,514

(22) Filed: Dec. 17, 2020

(65) Prior Publication Data

US 2022/0196253 A1 Jun. 23, 2022

(51) Int. Cl.
| | | |
|---|---|---|
| *F24D 19/10* | (2006.01) | |
| *F24H 1/00* | (2022.01) | |
| *F24H 1/18* | (2022.01) | |
| *G05B 23/02* | (2006.01) | |

(52) U.S. Cl.
CPC ........... *F24D 19/1063* (2013.01); *F24H 1/00* (2013.01); *F24H 1/18* (2013.01); *G05B 23/0218* (2013.01); *G05B 2223/02* (2018.08)

(58) Field of Classification Search
CPC .......... F24D 19/1063; F24H 1/00; F24H 1/18; G05B 2223/02; G05B 23/0218; G05B 23/0254; G05B 23/0286
See application file for complete search history.

(56) References Cited

U.S. PATENT DOCUMENTS

| | | | | |
|---|---|---|---|---|
| 2014/0202680 A1* | 7/2014 | Kusachi | ................. | F24H 1/145 165/287 |
| 2015/0114314 A1* | 4/2015 | Heo | ........................ | F24H 1/145 122/14.21 |
| 2017/0234578 A1* | 8/2017 | Sato | ........................ | F24H 1/145 165/11.1 |
| 2021/0095996 A1* | 4/2021 | Gvd | ........................ | G01D 1/00 |

FOREIGN PATENT DOCUMENTS

| | | |
|---|---|---|
| JP | 2008138952 | 6/2008 |
| JP | 2008215657 | 9/2008 |
| JP | 2009264684 | 11/2009 |

(Continued)

*Primary Examiner* — Kenneth M Lo
*Assistant Examiner* — Tameem D Siddiquee
(74) *Attorney, Agent, or Firm* — JCIPRNET (57) ABSTRACT

A hot water supply device including an inlet pipe, an outlet pipe, a burner unit, a heat exchanger, an exhaust aperture, a first temperature sensor detecting a measured exhaust temperature of the exhaust gas, a second temperature sensor detecting a water temperature of water entering the inlet pipe, and a processor. The processor is configured to obtain an error between the measured exhaust temperature and an estimated exhaust temperature, and detects that scale clogging has occurred inside the heat exchange tubing based on an index which is generated using the error between the measured exhaust temperature and the estimated exhaust temperature. The estimated exhaust temperature is a first predetermined value that is determined using a numerical equation which has at least the water temperature of water entering the inlet pipe and a scale number of the hot water supply device as variables of the numerical equation.

2 Claims, 8 Drawing Sheets

(56) References Cited

FOREIGN PATENT DOCUMENTS

| JP | 2014047980 | | 3/2014 | |
|----|------------|---|--------|---|
| JP | 2015224805 | | 12/2015 | |
| JP | 2017026280 | | 2/2017 | |
| JP | 2017-78537 | * | 4/2017 | ............. F22B 37/38 |
| JP | 2019124366 | | 7/2019 | |
| JP | 5986183 | * | 9/2019 | ............... F24H 1/10 |
| JP | 2020036133 | | 3/2020 | |
| WO | WO2018/113757 | * | 6/2018 | ........... D06F 39/082 |

* cited by examiner

| | | Average Flow Rate Q [L/(min.day)] | | | |
|---|---|---|---|---|---|
| | Condition | A | B | C | D |
| | | $Q < q1$ | $q1 \leq Q < q2$ | $q2 \leq Q < q3$ | $q3 \leq Q$ |
| Inclination of Water, I | e | $I < a1$ | Hardness Ae | Hardness Be | Hardness Ce | Hardness De |
| | f | $a1 \leq I < a2$ | Hardness Af | Hardness Bf | Hardness Cf | Hardness Df |
| | g | $a2 \leq I < a3$ | Hardness Ag | Hardness Bg | Hardness Cg | Hardness Dg |
| | h | $a3 \leq I$ | Hardness Ah | Hardness Bh | Hardness Ch | Hardness Dh |

HOT WATER SUPPLY DEVICE

BACKGROUND

Technical Field

The disclosure relates to a hot water supply device, and more particularly relates to scale deposition in the hot water supply device.

Description of Related Art

Generally, a hot water supply device includes a heat exchanger that supplies heat to water by exchanging heat between high temperature combustion gases and water that flows in a heat exchange tubing. When tap water whose hardness is high is used as the water that is supplied to the heat exchanger, scale precipitation occurs due to calcium and magnesium and the like that are present in the tap water combine with carbon dioxide ions or sulfuric acid ions or the like. When the temperature of the hot water becomes high, it becomes easier for scale to precipitate, and scale clogging may occur inside the heat exchange tubing of the heat exchanger due to scale being deposited. When scale is deposited in the heat exchange tubing, a problem occurs that the heat exchange efficiency of the heat exchanger is deteriorated.

If the use of the hot water supply device is continued in the state in which scale clogging has occurred, then the heat exchanger may be repeatedly subjected to thermal stress, and there is a fear that the heat exchanger may be damaged due to the heat exchange tubing cracking. If scale clogging has occurred, it is necessary to eliminate the scale. A number of hot water supply devices have been endowed with a function for detecting scale clogging and also of avoiding damage even if scale clogging has occurred.

For example, Japanese Laid-Open No. 2017-026280 discloses a hot water supply device that detects scale clogging in a heat transfer tubing in a case when a temperature of an exhaust gas after heat exchange exceeds a threshold. Japanese Laid-Open No. 2009-264684 discloses a hot water supply device that estimates the temperature of the combustion exhaust gas from which sensible heat has been recovered by the use of a combustion exhaust gas temperature estimation means, and then, even if the estimated temperature of the combustion exhaust gas has become elevated due to scale clogging, damage to the heat exchanger may be avoided by performing combustion control so that the estimated temperature of the combustion exhaust gas does not exceed a predetermined temperature or by stopping combustion, and also notifies the user that scale clogging has occurred.

However, in the above described hot water supply devices, an issue arises that the hot water supply device cannot accurately detect scale clogging in a case when a scale number of the hot water supply device is low, or in a case when the temperature of the hot water being dispensed by the hot water supply device is low.

Therefore, a hot water supply device which can more accurately detect scale clogging is needed.

SUMMARY

The disclosure provides a hot water supply device, adapted to generate hot water through heat exchange. The hot water supply device includes an inlet pipe, an outlet pipe, a burner unit, a heat exchanger, an exhaust aperture, a first temperature sensor, a second temperature sensor, and a processor. The burner unit combusts fuel gas to generate heat. The heat exchanger has a heat exchange tubing disposed between the inlet pipe and the outlet pipe, and is adapted to exchange heat between fuel gas combusted by the burner unit and water passing through the heat exchanger. The exhaust aperture discharges exhaust gas after heat exchange by the heat exchanger. The first temperature sensor detects a measured exhaust temperature of the exhaust gas. The second temperature sensor detects a water temperature of water entering the inlet pipe. In a steady state combustion operation of the hot water supply device, the processor is configured to obtain an error between the measured exhaust temperature and an estimated exhaust temperature, and detects that scale clogging has occurred inside the heat exchange tubing based on an index which is generated using the error between the measured exhaust temperature and the estimated exhaust temperature. The estimated exhaust temperature is a first predetermined value that is determined using a numerical equation which has at least the water temperature of water entering the inlet pipe and a scale number of the hot water supply device as variables of the numerical equation.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
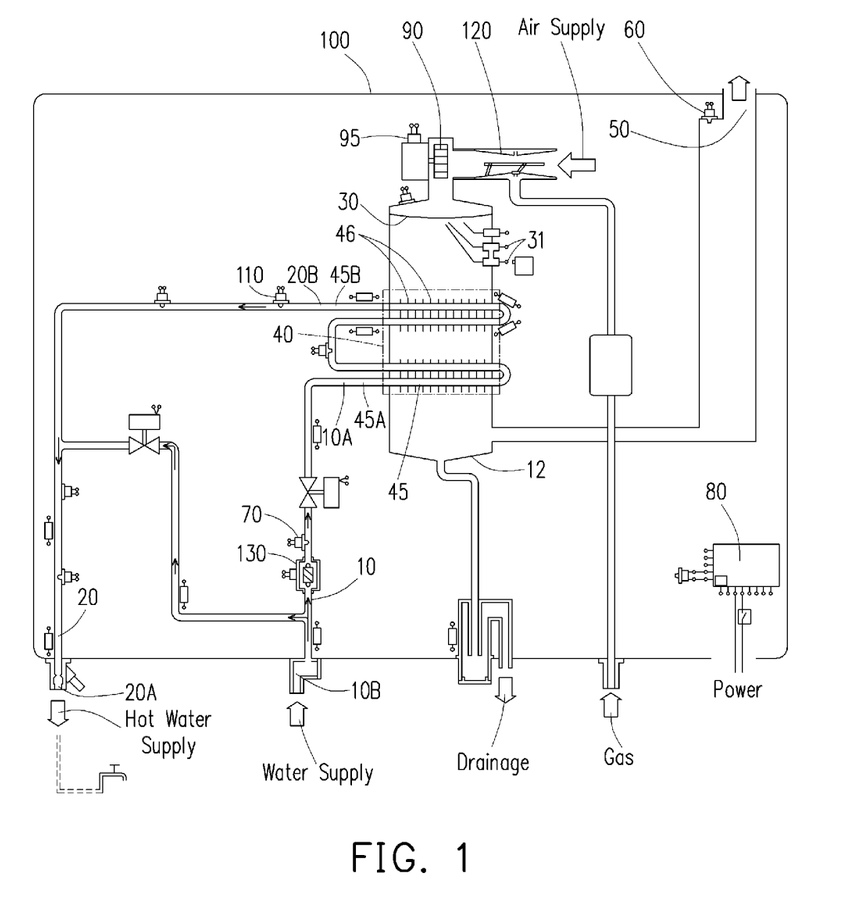
FIG. 1 is a schematic diagram illustrating a hot water supply device according to an embodiment of the disclosure.

According to an exemplary embodiment of the disclosure, a hot water supply device is provided. FIG. 1 is a schematic diagram illustrating a hot water supply device according to an embodiment of the disclosure.

Referring to FIG. 1, a hot water supply device 100 is adapted to generate hot water through heat exchange. The hot water supply device 100 includes an inlet pipe 10, an outlet pipe 20, a combustion unit 12, a burner unit 30, a heat exchanger 40, an exhaust aperture 50, a first temperature sensor 60, a second temperature sensor 70, a processor 80, a fan 90, a rotation speed sensor 95, and a venturi mixer 120. In the present embodiment, a material of the inlet pipe 10 and the outlet pipe 20 are, for example, copper. However, the disclosure is not limited thereto, and the inlet pipe 10 and the outlet pipe 20 may be made of other material.

The burner unit 30 is disposed in the combustion unit 12. The combustion unit 12 mixes together fuel gas supplied from a fuel supply conduit (not shown in the figures) and air for combustion supplied by a fan 90, and combusts the resulting mixture. The rotation speed sensor 95 detects a rotation speed of the fan 90. The burner unit 30 includes a spark plug 31 for igniting the fuel-air mixture gases supplied from the burner unit 30 by generating an ignition spark between itself and an ignition target provided in the burner unit 30.

The heat exchanger 40 is, for example, a fin and tube type heat exchanger, and includes a heat exchange tubing 45 and a plurality of fins 46 that are fixed to the heat exchange tubing 45 so as to be capable of heat transfer. The heat exchanger 40 is connected between the inlet pipe 10 and the outlet pipe 20. In the present embodiment, one end 45A of the heat exchange tubing 45 connects with one end 10A of the inlet pipe 10, and an other end 45B of the heat exchange tubing 45 connects with an other end 20B of the outlet pipe 20.

Water enters the hot water supply device 100 from an other end 10B of the inlet pipe 10, the water is heated by the heat exchanger 40, and then exits from a one end 20A of the outlet pipe 20. The burner unit 30 of the hot water supply device 100 combusts fuel gas to generate heat. The heat exchanger 40 exchanges heat between the fuel gas combusted by the burner unit 30 and the water passing through the heat exchanger 40.

The combusted fuel gas is turned into exhaust gas after heat exchange is completed by the heat exchanger 40. The exhaust aperture 50 discharges exhaust gas after heat exchange by the heat exchanger 40. The first temperature sensor 60 is disposed at the exhaust aperture 50 and detects a measured exhaust temperature of the exhaust gas. In the present embodiment, the first temperature sensor 60 is, for example, a thermistor. However, the disclosure is not limited thereto and other temperature sensors such as a thermocouple and the like may be used. In the present embodiment, a material of the exhaust aperture 50 is, for example, PVC plastic. However, the disclosure is not limited thereto, and the exhaust aperture 50 may be made of other material.

The second temperature sensor 70 is disposed at the inlet pipe 10 and detects a water temperature of the water entering the inlet pipe 10. In the present embodiment, the second temperature sensor 70 is, for example, a thermistor. In other embodiments, the second temperature sensor 70 may be a thermocouple. However, the disclosure is not limited thereto and other temperature sensors may be used.

The hot water supply device 100 further includes the processor 80. The processor 80 is configured to obtain an error between the measured exhaust temperature and an estimated exhaust temperature, and detects that scale clogging has occurred inside the heat exchange tubing based on an index which is generated using the error between the measured exhaust temperature and the estimated exhaust temperature.

In more detail, the first temperature sensor 60 measures a temperature of the exhaust gas that is discharged at the exhaust aperture 50, so as to obtain the measured exhaust temperature. The processor 80 estimates a temperature of the exhaust gas that is discharged at the exhaust aperture 50 through calculation, so as to obtain the estimated exhaust temperature. The estimated exhaust temperature is a first predetermined value. The details relating to the calculation for obtaining the estimated exhaust temperature will be described later.

Further, the measured exhaust temperature and the estimated exhaust temperature are then compared with each other. And an error between the measured exhaust temperature and an estimated exhaust temperature is calculated by subtracting the measured exhaust temperature from the estimated exhaust temperature:

$$\text{Error} = \text{Estimated Exhaust Temperature} - \text{Measured Exhaust Temperature} \quad \text{(formula 1)}$$

In the present embodiment, the error is calculated by subtracting the measured exhaust temperature from the estimated exhaust temperature, however, the disclosure is not limited thereto. In other embodiments, the error may be calculated by subtracting the estimated exhaust temperature from the measured exhaust temperature.

Figure 2:
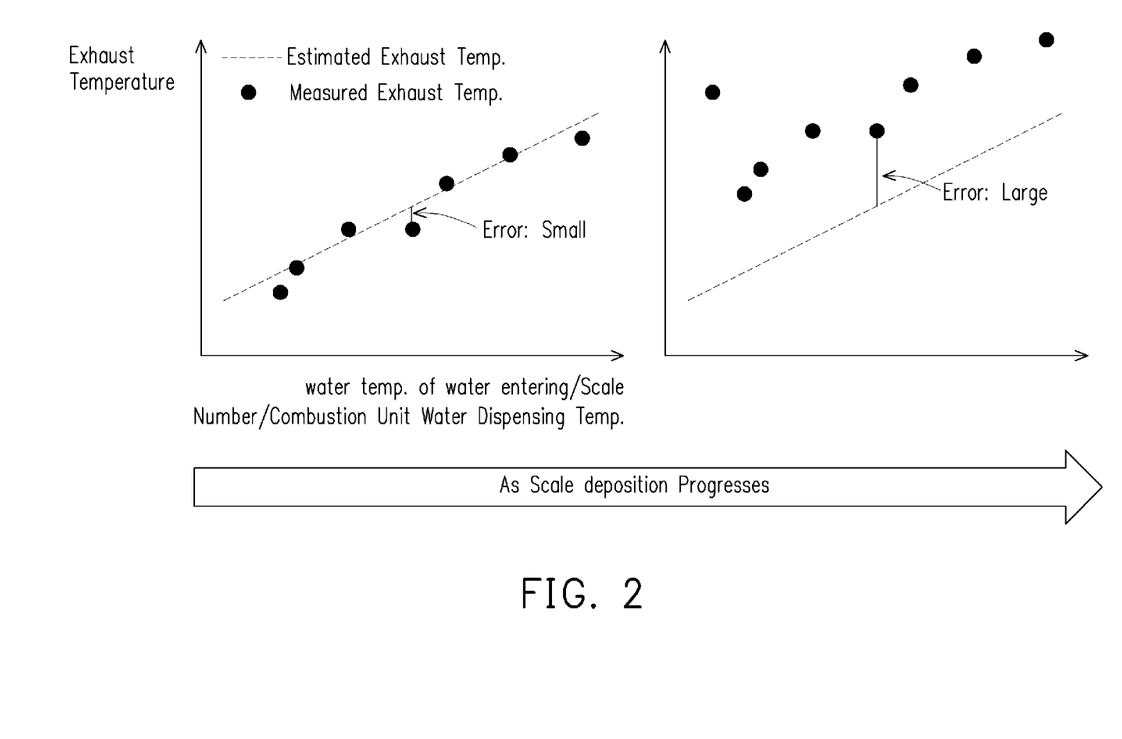
FIG. 2 shows a graph illustrating an estimated exhaust temperature and a measured exhaust temperature of the hot water supply device as scale deposition progresses, according to an embodiment of the disclosure.

FIG. 2 shows a graph illustrating an estimated exhaust temperature and a measured exhaust temperature of the hot water supply device as scale deposition progresses, according to an embodiment of the disclosure. Two graphs are shown in FIG. 2. The graph on the right shows a state in which scale deposition is more advanced compared to a state of the scale deposition in the graph shown on the left. Referring to FIG. 2, the estimated exhaust temperature that is calculated by the processor 80 is shown by the dotted (dashed) line. Further, the measured exhaust temperature that is measured by the first temperature sensor 60 is shown by the dots as measurement points. In FIG. 2, a difference between the measured exhaust temperature and the estimated exhaust temperature is small in the left graph, and a difference between the measured exhaust temperature and the estimated exhaust temperature is large in the right graph. That is to say, the difference between the measured exhaust temperature and the estimated exhaust temperature is large as scale deposition in the heat exchange tubing 45 progresses/advances. On the other hand, the difference between the measured exhaust temperature and the estimated exhaust temperature is small when scale deposition has not yet accumulated in the heat exchange tubing 45. When scale deposition has not progressed yet, the measured exhaust temperature will be close to the estimated exhaust temperature. Hence, the difference may be referred to as "small", as shown in the left graph. However, when scale deposition has progressed, the measured exhaust temperature will not be as close to the estimated exhaust temperature, relatively. Hence, the difference may be referred to as "large", as shown in the right graph. It should be noted, the difference which may be considered as small, and the difference which may be considered as large are relative, and the disclosure is not intended to limit what difference is considered as a small difference or as a large difference. It should be understood, the difference increases when scale deposition in the heat exchange tubing 45 progresses. Moreover, an efficiency of the heat transfer decreases due to the scale deposition in the heat exchange tubing 45, such that there will be a tendency for the measured exhaust temperature to be higher than the estimated exhaust temperature as scale deposition progresses, as can be seen in the right graph in FIG. 2.

Figure 3:
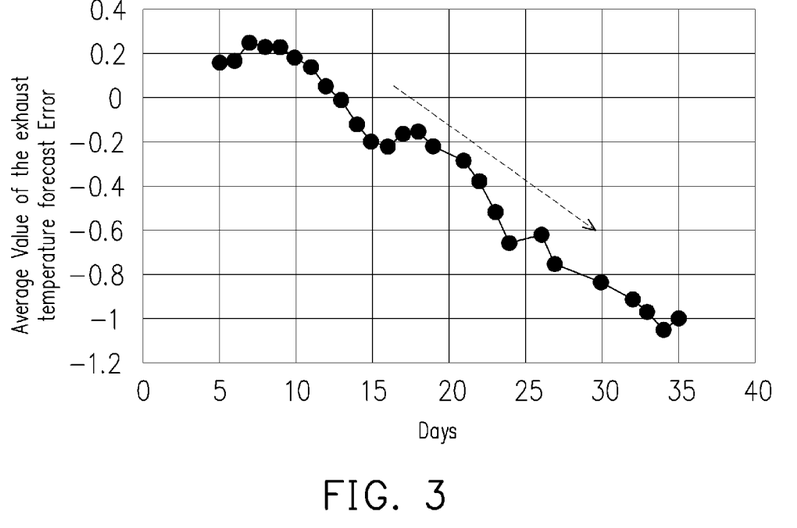
FIG. 3 shows a graph illustrating an average value of the exhaust temperature forecast error over time, according to an embodiment of the disclosure.

Next, the index which is generated using the error will be described. The processor 80 generates the index based on the error between the measured exhaust temperature and the estimated exhaust temperature. FIG. 3 shows a graph illustrating an average value of the exhaust temperature forecast error over time, according to an embodiment of the disclosure. Here, the exhaust temperature forecast error refers to the error between the measured exhaust temperature and the estimated exhaust temperature. More specifically, the average value of the exhaust temperature forecast error refers to an average value of the errors over time. The Y-axis represents an average value of the error between the measured exhaust temperature and the estimated exhaust temperature. The X-axis represents time in days. As seen in FIG. 3, the average value of the error (where the error is obtained by the equation: Error=Estimated Exhaust Temperature−Measured Exhaust Temperature) has a consistently negative value after around day 13. As scale deposition progresses over time, the efficiency of the heat transfer decreases due to the scale deposition in the heat exchange tubing 45, such that there will be a tendency for the measured exhaust temperature to be higher than the estimated exhaust temperature. Therefore, as scale deposition progresses, the average value of the error consistently becomes a negative value.

The processor 80 detects that scale clogging has occurred inside the heat exchange tubing 45 based on the index, namely the index of the average value of the errors over time, which is generated using the error between the measured exhaust temperature and the estimated exhaust temperature. In more detail, a plurality of errors are obtained at a plurality of time instances, and the index that is generated is an average value of the plurality of errors. Then, scale clogging is detected when the average value of the plurality of errors falls below or exceeds a second predetermined value. The second predetermined value is a predetermined value which may be set according to requirements, and is not intended to limit the disclosure. Furthermore, the second predetermined value acts as a threshold for comparing the index that is generated using the error. The second predetermined value is set to −0.6 degrees, for example. When the average value of the error falls below −0.6 degrees, at around day 34 as seen in FIG. 3, the processor 80 detects scale clogging has occurred in the heat exchange tubing 45 since the index has fallen below the second predetermined value of −0.6 degrees. That is, in the present embodiment, −0.6 degrees acts as the threshold for detecting scale clogging in the heat exchange tubing 45.

In the present embodiment, the error is calculated by the equation: Error=Estimated Exhaust Temperature−Measured Exhaust Temperature. Therefore, as scale deposition progresses, the average value of the error consistently becomes a negative value. In other embodiments, the error may be calculated by subtracting the estimated exhaust temperature from the measured exhaust temperature such as by the equation: Error=Measured Exhaust Temperature−Estimated Exhaust Temperature. In this example, as scale deposition progresses over time, the efficiency of the heat transfer decreases due to the scale deposition in the heat exchange tubing 45, such that there will be a tendency for the measured exhaust temperature to be higher than the estimated exhaust temperature. Therefore, as scale deposition progresses, the average value of the error consistently becomes a positive value. In this case, scale clogging is detected when the average value of the plurality of errors exceeds a second predetermined value, instead of falling below the second predetermined value as described previously. The second predetermined value is a predetermined value which may be arbitrarily set. As an example, the second predetermined value is set to 0.6 degrees. Furthermore, the second predetermined value acts as a threshold for comparing the index that is generated using the error. When the average value of the error exceeds 0.6 degrees, the processor 80 detects scale clogging has occurred in the heat exchange tubing 45 since the index has exceeded the second predetermined value of 0.6 degrees. That is, in the present embodiment, 0.6 degrees acts as the threshold for detecting scale clogging in the heat exchange tubing 45.

Figure 4:
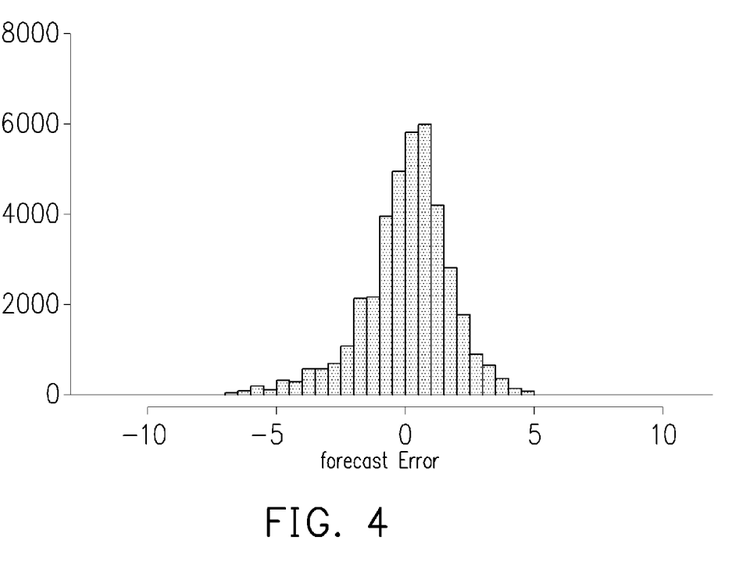
FIG. 4 shows a graph illustrating a distribution of the exhaust temperature forecast error according to frequency of occurrence, according to an embodiment of the disclosure.
Figure 5:
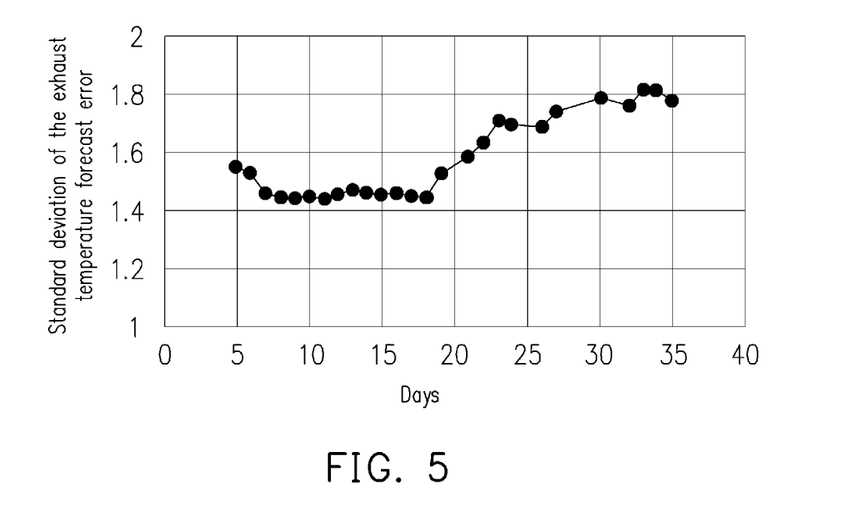
FIG. 5 shows a graph illustrating a standard deviation of the exhaust temperature forecast error over time, according to an embodiment of the disclosure.
Figure 6:
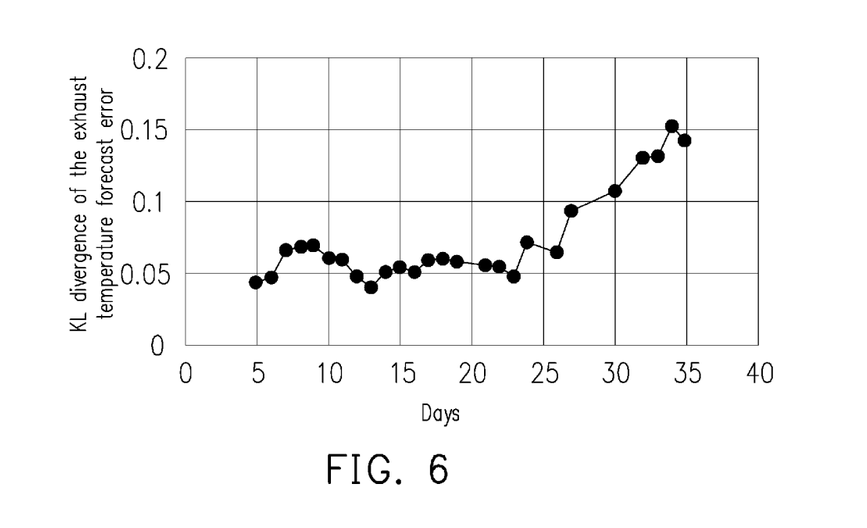
FIG. 6 shows a graph illustrating a KL divergence of the exhaust temperature forecast error over time, according to an embodiment of the disclosure.

It should be noted, the index generated that is shown in FIG. 3 is one embodiment of the disclosure only. Various other indexes may be generated using the error between the measured exhaust temperature and the estimated exhaust temperature. For example, FIG. 4 shows a graph illustrating a distribution of the exhaust temperature forecast error according to frequency of occurrence, according to an embodiment of the disclosure. FIG. 5 shows a graph illustrating a standard deviation of the exhaust temperature forecast error over time, according to an embodiment of the disclosure. FIG. 6 shows a graph illustrating a KL divergence (Kullback-Leibler divergence) of the exhaust temperature forecast error over time, according to an embodiment of the disclosure. The above are indexes which may be generated using the error between the measured exhaust temperature and the estimated exhaust temperature. However, the index of the disclosure is not limited thereto, and other indexes may be generated using the error between the measured exhaust temperature and the estimated exhaust temperature. As described above, scale clogging in the hot water supply device may be detected when the index generated using the error (error between the measured exhaust temperature and the estimated exhaust temperature) falls below or exceeds the second predetermined value.

Next, the details relating to the calculation for obtaining the estimated exhaust temperature will be described. In one embodiment of the disclosure, the estimated exhaust temperature is calculated by the numerical equation of formula 2 below. Furthermore, in the equation below, a and b are coefficients. The coefficients may be a number such as an integer, a decimal, a fraction, or the like. As an example, in formula 2, when the temperature is expressed in Celsius (the estimated exhaust temperature and water temperature of water entering the inlet pipe expressed in Celsius), and the Scale number is expressed in liters per minute (° C.·l/min, see details regarding Scale number below), the coefficients a and b may be set to following: a=1.22, b=0.801. Through experiments, it has been determined that a preferable range of the coefficients a and b are: a: 1.1~1.4 and b: 0.7~0.9. However, the coefficients a and b are not limited thereto. The coefficients a and b are predetermined values which may be set according to requirements, and are not intended to limit the disclosure.

$$\begin{bmatrix} \text{Estimated Exhaust} \\ \text{Temperature} \end{bmatrix} = \qquad \text{(formula 2)}$$

$$a \times \begin{bmatrix} \text{Water temperature} \\ \text{of water entering} \\ \text{the inlet pipe} \end{bmatrix} + b \times \begin{bmatrix} \text{Scale number of} \\ \text{the hot water} \\ \text{supply device} \end{bmatrix}$$

In the equation above, the estimated exhaust temperature is a first predetermined value that is determined using a numerical equation which has at least the water temperature of water entering the inlet pipe and a scale number of the hot water supply device as variables of the numerical equation.

The scale number is defined as a heating capacity of the hot water supply device. More specifically, the scale number may be further defined as a volume of water which is at a predetermined temperature higher than the temperature of water entering the hot water supply device which may be dispensed by the hot water supply device per unit of time. For example, in the present embodiment, the scale number represents how many liters of water having a temperature that is 25 degrees Celsius higher than the temperature of the water entering the hot water supply device may be dispensed by the hot water supply device per minute. Here, the equation is described in metric units (Celsius, Liters, etc.). However, the scale number is not limited to being described by metric units, and other units of measurement may be used as long as the scale number reflects a heating capacity of the hot water supply device.

In the present embodiment, the scale number is calculated by the following equation of formula 3. The number 25 in the equation below is a constant.

$$\begin{bmatrix} \text{Scale} \\ \text{Number} \end{bmatrix} = \left( \frac{(\text{Dispense Temp}[^\circ\text{C.}] - \text{Water Temp}[^\circ\text{C.}]) \times (\text{Flow Rate}[\ell/\text{min}])}{25} \right) \qquad \text{(formula 3)}$$

From the equation in formula 3, in the present embodiment, the scale number carries the units: ° C.·l/min. In other embodiments, ° C. may be represented in ° F. (Fahrenheit), and l (liters) may be represented in Gallons, such that the scale number may be represented by ° F.·Gallons/minute. However, the disclosure is not limited thereto, and other units of measurement may be used as long as the scale number reflects a heating capacity of the hot water supply device.

An example of the scale number is further described in the following. A hot water supply device having a scale number of 18.0 may dispense hot water that is 25° Celsius above the water temperature of the water entering the inlet pipe, and may dispense the hot water at a flow rate of 18.0 liters per minute. In another example, when the water temperature of the water entering the hot water supply device is 5 degrees Celsius, and it is desired for the hot water supply device to dispense hot water with a temperature of 42.5 degrees Celsius, then the hot water supply device is capable of dispensing hot water with a temperature of 42.5 degrees Celsius at the flow rate of 12 Liters per minute. Calculation is provided as below in formula 4.

Scale Number=(42.5° C.−5° C.)×(12 Liters/min)
=18.0     (formula 4)

In other words, the hot water supply device with a scale number of 18.0 may dispense hot water that is 25° Celsius above the water temperature of the water entering the inlet pipe, and may dispense the hot water at a flow rate of 18.0 liters per minute. However, if the hot water supply device with a scale number of 18 is to dispense hot water that is 37.5° Celsius above (instead of 25° Celsius above) the water temperature of the water entering the inlet pipe (i.e. dispense hot water at temperature of 42.5° C. in the example above), then the hot water may be dispensed at a flow rate of 12 liters per minute (compared to 18 liters per minute). It may be understood that the flow rate of the water is reduced when the temperature of water to be dispensed becomes higher.

An example of the scale number of the hot water supply device was described above using formula 3 and formula 4. Now, referring to formula 2, the estimated exhaust temperature will continue to be described. The estimated exhaust temperature is a first predetermined value that is determined using the numerical equation which has at least the water temperature of water entering the inlet pipe, and the scale number of the hot water supply device as variables of the numerical equation. The numerical equation for determining the estimated exhaust temperature may include other variables as well. As an example, the numerical equation for determining the estimated exhaust temperature may further include a combustion unit water dispensing temperature Tout as a variable. The combustion unit water dispensing temperature Tout is not a temperature that is set by the combustion 12 unit itself, but refers to a temperature of the hot water flowing through the hot water pipe that passes through the combustion unit 12. The combustion unit water dispensing temperature Tout is detected by, for example, the combustion unit temperature sensor 110, shown in FIG. 1. The combustion unit temperature sensor 110 detects a temperature of the hot water flowing in the pipe. In the present embodiment, the combustion unit temperature sensor 110 is, for example, a thermistor. However, the disclosure is not limited thereto and other temperature sensors such as a thermocouple and the like may be used.

An example of the numerical equation for determining the estimated exhaust temperature with an additional variable is shown below, in formula 5. The disclosure is not limited thereto, and the numerical equation for determining the estimated exhaust temperature may include other variables. In the equation below, c, d and e are coefficients. The coefficients may be a number such as an integer, a decimal, a fraction, or the like. As an example, in formula 5, when the temperature is expressed in Celsius (the estimated exhaust temperature, the water temperature of water entering the inlet pipe, and the combustion unit water dispensing temperature expressed in Celsius), and the Scale number is expressed in liters per minute (° C.·l/min), the coefficients c, d and e may be set to following: c=0.58, d=0.27, e=0.16. Through experiments, it has been determined that a preferable range of the coefficients c, d and e are: c: 0.5~0.7 and d: 0.2~0.4, e: 0.1~0.3. However, the coefficients c, d and e are not limited thereto. The coefficients c, d and e are predetermined values which may be set according to requirements, and are not intended to limit the disclosure.

$$\begin{bmatrix} \text{Estimated Exhaust} \\ \text{Temperature} \end{bmatrix} = c \times \begin{bmatrix} \text{Water temperature} \\ \text{of water entering} \\ \text{the inlet pipe} \end{bmatrix} + \qquad \text{(formula 5)}$$

$$d \times \begin{bmatrix} \text{Scale number of} \\ \text{the hot water} \\ \text{supply device} \end{bmatrix} + e \times \begin{bmatrix} \text{Combustion unit water} \\ \text{dispensing Temperature} \end{bmatrix}$$

Figure 7:
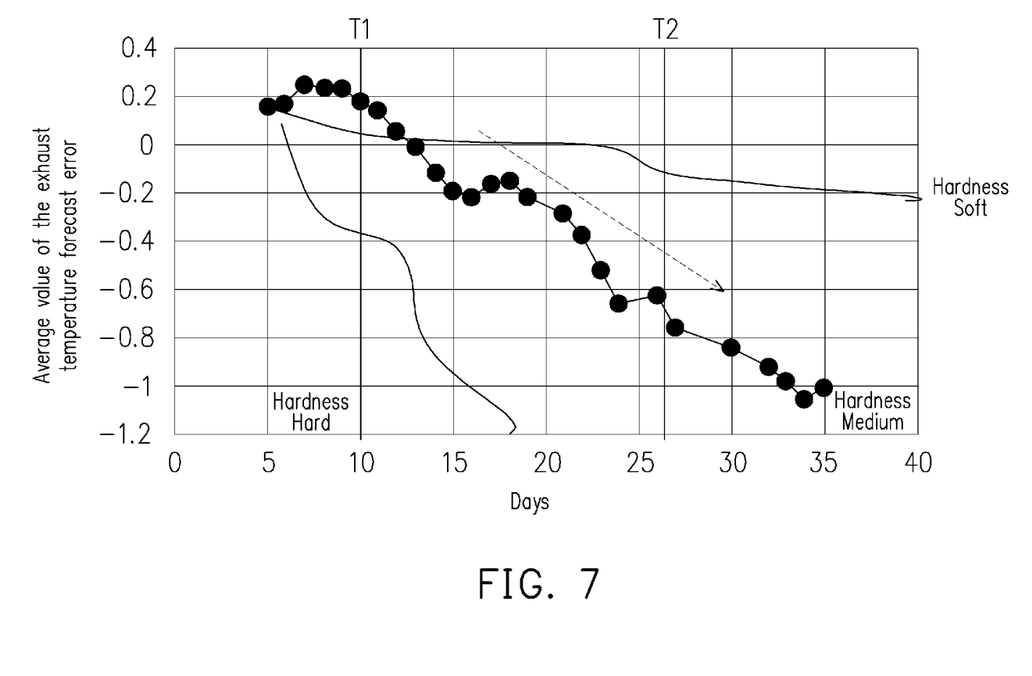
FIG. 7 shows a graph illustrating an average value of the exhaust temperature forecast error over time for waters with a water hardness of Hard, Soft, and Medium, according to an embodiment of the disclosure.

Next, an embodiment for determining an expected time period until water leakage occurs in the hot water supply device will be described. FIG. 7 shows a graph illustrating an average value of the exhaust temperature forecast error over time for waters with a water hardness of Hard, Soft, and Medium, according to an embodiment of the disclosure. Referring to FIG. 7, FIG. 7 shows that when the water hardness is hard, the scale deposition progresses at a faster rate, and when the water hardness is soft, the scale deposition progresses at a slower rate. That is, when the water hardness is soft, the error between the estimated exhaust temperature and the measured exhaust temperature is approximately −0.2 degrees Celsius after approximately 35 days. On the other hand, when the water hardness is hard, the error between the estimated exhaust temperature and the measured exhaust temperature is approximately −1.2 degrees Celsius after approximately 18 days. The error between the estimated exhaust temperature and the measured exhaust temperature develops at a faster rate in the hard water compared to the error in the Soft water. In other words, scale deposition progresses faster in the hard water compared to the soft water.

Figure 8:
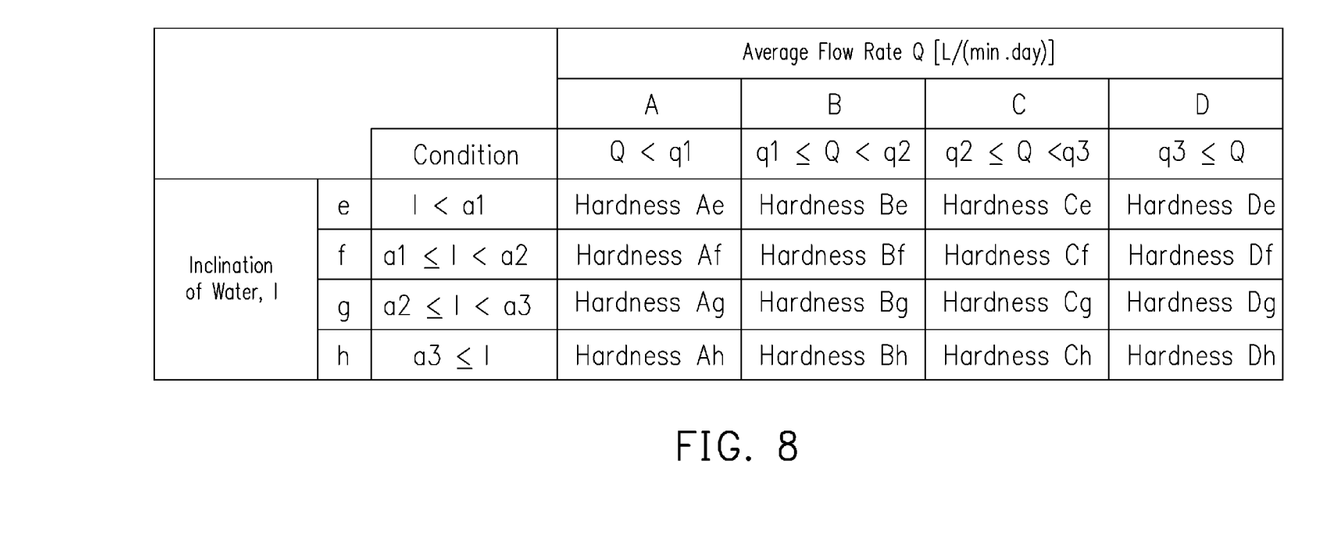
FIG. 8 shows an example of a water hardness relationship table that describes a relationship between a plurality of parameters and water hardness, according to an embodiment of the disclosure.

FIG. 8 shows an example of a water hardness relationship table that describes a relationship between a plurality of parameters and water hardness, according to an embodiment of the disclosure. It is noted here that the relationship table in FIG. 8 shows an example that is applicable when the combustion unit setting temperature is set to a temperature K. The relationships shown in the figures may vary depending on the combustion unit setting temperature. Referring to FIG. 8, a water hardness of the water entering the inlet pipe 10 is estimated according to a plurality of parameters. The plurality of parameters include the inclination of water (entering the hot water supply) which is determined in formula 6 using the error between the measured exhaust temperature and the estimated exhaust temperature, a combustion unit setting temperature, and a hot water flow rate.

The inclination of water is one of the factors used in determining whether the water is inclined towards soft water, medium water, hard water, etc. Furthermore, the water hardness is determined according to the relationship table expressing the relationship between the plurality of parameters and the water hardness. In other words, the relationship table expresses a relationship between the inclination of water and the water hardness, a relationship between the combustion unit setting temperature and the water hardness, and a relationship between the hot water flow rate and the water hardness. Because the inclination of water is calculated in formula 6 using the error between the measured exhaust temperature and the estimated exhaust temperature, it may be understood the relationship table expresses a relationship between the error and the water hardness, a relationship between the combustion unit setting temperature and the water hardness, and a relationship between the hot water flow rate and the water hardness.

It should be noted, the combustion unit setting temperature is not an actual temperature of the hot water that is being dispensed from the combustion unit. Here, the combustion unit setting temperature is a target temperature for the hot water to be dispensed from the hot water supply device. The combustion unit setting temperature is a setting value of the hot water supply device. On the other hand, the combustion unit water dispensing temperature Tout is the actual measured temperature of the hot water that is being dispensed from the combustion unit that is measured by the combustion unit temperature sensor 110.

The inclination of the water that is supplied to the hot water supply device 100 is calculated from the equation of formula 6 below.

$$\text{Inclination of water} = \left[\frac{\left(\begin{array}{c}\text{Exhaust Temperature}\\ \text{Forecast Error}(t=T1)\end{array}\right) - \left(\begin{array}{c}\text{Exhaust Temperature}\\ \text{Forecast Error}(t=T2)\end{array}\right)}{\text{Burn Time }(T1-T2)}\right] \quad \text{(formula 6)}$$

Next, a flow rate Q of the water flowing through the pipe of the hot water supply device is measured by a flow rate sensor 130. The flow rate sensor 130 is, for example, a hall IC sensor. However, the disclosure is not limited thereto and other flow rate sensors may be used. In FIG. 8, when the combustion unit setting temperature is set to temperature K, when a value I representing the Inclination of water satisfies the condition f (i.e. a1≤I≤a2), and the flow rate Q satisfies the condition C (i.e. q2≤Q≤q3), then the water hardness of the water entering the hot water supply device 100 is estimated as having a hardness Cf, as determined from the relationship table example shown in FIG. 8. In FIG. 8, a1~a3 and q1~q3 are predetermined numerical values and are not intended to limit the disclosure. In the above, an example process of determining the water hardness was described.

Cf, Ag, Bh, Ae and the like shown in FIG. 8 are predetermined numerical values and may be obtained through experiments. In the present embodiment, the water hardness Cf, Ag, Bh, Ae and the like are expressed, for example, in the units of milligrams per Liter (mg/L). The water hardness Cf, Ag, Bh represents the mineral content in the water. The water hardness may be expressed in other units, for example, parts per million, grains per gallon, etc. However, the invention is not limited thereto. The predetermined numerical values of Cf, Ag, Bh, Ae and the like are used to determine the water hardness, namely whether the water is soft water, medium water, hard water, etc.

In FIG. 8, as an example, Cf, Ag, Bh, etc. may be set to following: Cf=150 mg/L, Ag=300 mg/L, Bh=250 mg/L, etc. It may be understood in FIG. 8, the smaller the flow rate Q (that is to say, moving towards the left in the table shown in FIG. 8), the harder the water hardness. On the other hand, the larger the inclination of water I (that is to say, moving towards the bottom in the table shown in FIG. 8), the harder the water hardness. For reference, generally speaking, a water hardness of 200 mg/L and above may be considered as having a hard water hardness. A water hardness of 100 mg/L~200 mg/L may be considered as having a medium water hardness. A water hardness below 100 mg/L may be considered as having a soft water hardness. The above ranges for water hardness is for reference only and is not intended to limit the disclosure.

In other embodiments, the water hardness of the water entering the inlet pipe 10 may be estimated according to a relationship expression, instead of a relationship table. However, the disclosure is not limited thereto. For example, the water hardness may be expressed using a function having the combustion unit setting temperature, the average flow rate, and the inclination of water as variables of the function. For example, the water hardness may be estimated from the following formula 7:

$$\text{Water Hardness} = f(\text{combustion unit setting temperature, average flow rate, inclination of water}) \quad \text{(formula 7)}$$

Figure 9:
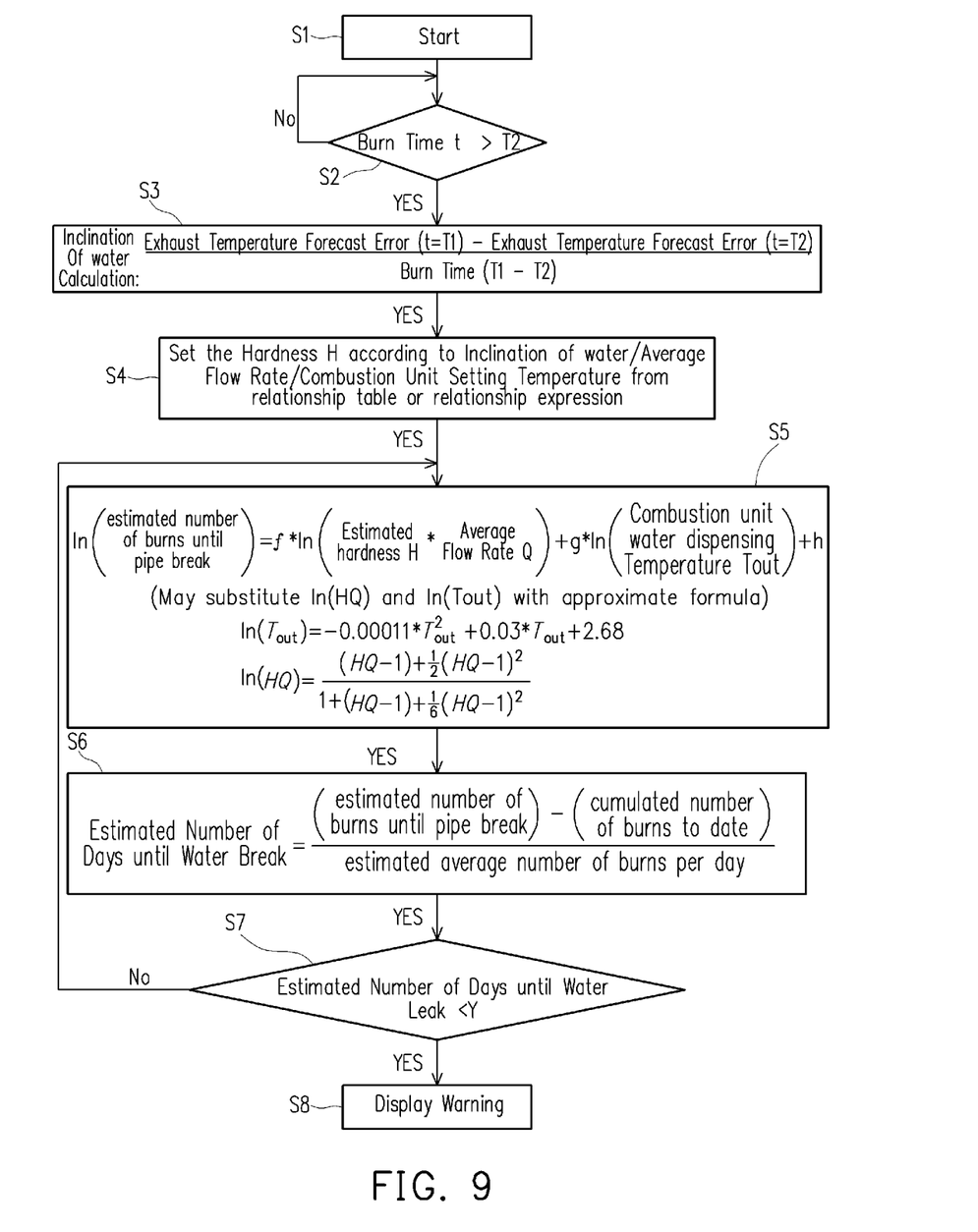
FIG. 9 shows a flow chart illustrating steps for estimating a number of days until pipe water leakage occurs in a hot water supply device by using a processor of the hot water supply device, according to an embodiment of the disclosure.

Once the water hardness is determined, then an expected time period until water leakage occurs in the hot water supply device is determined based on the estimated water hardness, the combustion unit water dispensing temperature Tout, the hot water flow rate, a cumulated number of burns to date, and an estimated number of burns per unit period. FIG. 9 shows a flow chart illustrating steps for estimating a number of days until pipe water leakage occurs in a hot water supply device by using a processor of the hot water supply device, according to an embodiment of the disclosure.

Referring to FIG. 9, in step S1, the processor 80 starts the program. In step S2, the processor 80 checks whether the burn time t is greater than T2. If YES, the processor 80 moves to step S3. In step S3, an inclination of the water entering the hot water supply device 100 is calculated according to formula 6. The inclination of water is a representation of whether the water entering the hot water supply device 100 has a water hardness that is inclined towards soft water, medium water or hard water and the like.

Next, in step S4, the water hardness of the water entering the inlet pipe 10 is determined according to the inclination of the water calculated from the error between the measured exhaust temperature and the estimated exhaust temperature in formula 6, a combustion unit setting temperature, and a hot water flow rate Q by using the relationship table such as shown in FIG. 8 expressing the relationship between the plurality of parameters and the water hardness.

Next in step S5, the estimated number of burns until pipe break is calculated according to an formula 8 below, wherein f, g, and h are coefficients. As an example, in formula 8, when the temperature is expressed in Celsius (the combustion unit water dispensing temperature expressed in Celsius), and the estimated hardness expressed in milligrams per liter (mg/L), and the flow rate expressed in Liters per min·day (L/(min·day)), then the coefficients f, g and h may be set to following: f=−0.87, g=−6.10, h=33.8. Through experiments, it has been determined that a preferable range of the coefficients f, g and h are: f: −0.57~−1.17 and g: −4.60~−7.60, h: 25.8~41.8. However, the coefficients f, g and h are not limited thereto. The coefficients f, g and h are predetermined values which may be set according to requirements, and are not intended to limit the disclosure:

$$\ln\begin{pmatrix} \text{estimated number of} \\ \text{burns until pipe break} \end{pmatrix} = \qquad \text{(formula 8)}$$
$$f \times \ln\begin{pmatrix} \text{Estimated} \\ \text{hardness } H \end{pmatrix} \times \begin{pmatrix} \text{Average} \\ \text{Flow Rate } Q \end{pmatrix} +$$
$$g \times \ln\begin{pmatrix} \text{Combustion unit water} \\ \text{dispensing temperature Tout} \end{pmatrix} + h$$

The above equation may be represented as following:

$$\ln\begin{pmatrix} \text{estimated number of} \\ \text{burns until pipe break} \end{pmatrix} = f \times \ln(HQ) + g \times \ln(Tout) + h$$

In order to simplify the calculation for obtaining the estimated number of burns until pipe break, the above formula may be converted to an approximate formula using the substitutions below for ln(HQ) and ln(Tout).

$$\ln(T_{out}) = -0.00011 * T_{out}^2 + 0.03 * T_{out} + 2.68 \qquad \text{(formula 9)}$$

$$\ln(HQ) = \frac{(HQ-1) + \frac{1}{2}(HQ-1)^2}{1 + (HQ-1) + \frac{1}{6}(HQ-1)^2} \qquad \text{(formula 10)}$$

The simplified calculation substituting the approximate formula may be calculated, for example, with the processor 80.

Next in step S6, the estimated number of days until water leak, due to the pipe breaking, may be calculated by the formula 11 below:

$$\text{Estimated Number of Days until Water Break} = \qquad \text{(formula 11)}$$
$$\frac{\begin{pmatrix} \text{estimated number of} \\ \text{burns until pipe break} \end{pmatrix} - \begin{pmatrix} \text{cumulated number} \\ \text{of burns to date} \end{pmatrix}}{\text{estimated average number of burns per day}}$$

Next in step S7, the estimated number of days until water leak obtained in step S6 is compared to a predetermined value Y. When the estimated number of days until water leak is less than the predetermined value Y, then a warning is displayed in step S8. The predetermined value Y may be set according to requirements, and is not intended to limit the disclosure.

In FIG. 9, the steps for estimating a number of days until pipe water leakage occurs in a hot water supply device by using a processor of the hot water supply device was described. Next, the steps for estimating a number of days until pipe water leakage occurs in a hot water supply device by using an external server will be described.

Figure 10:
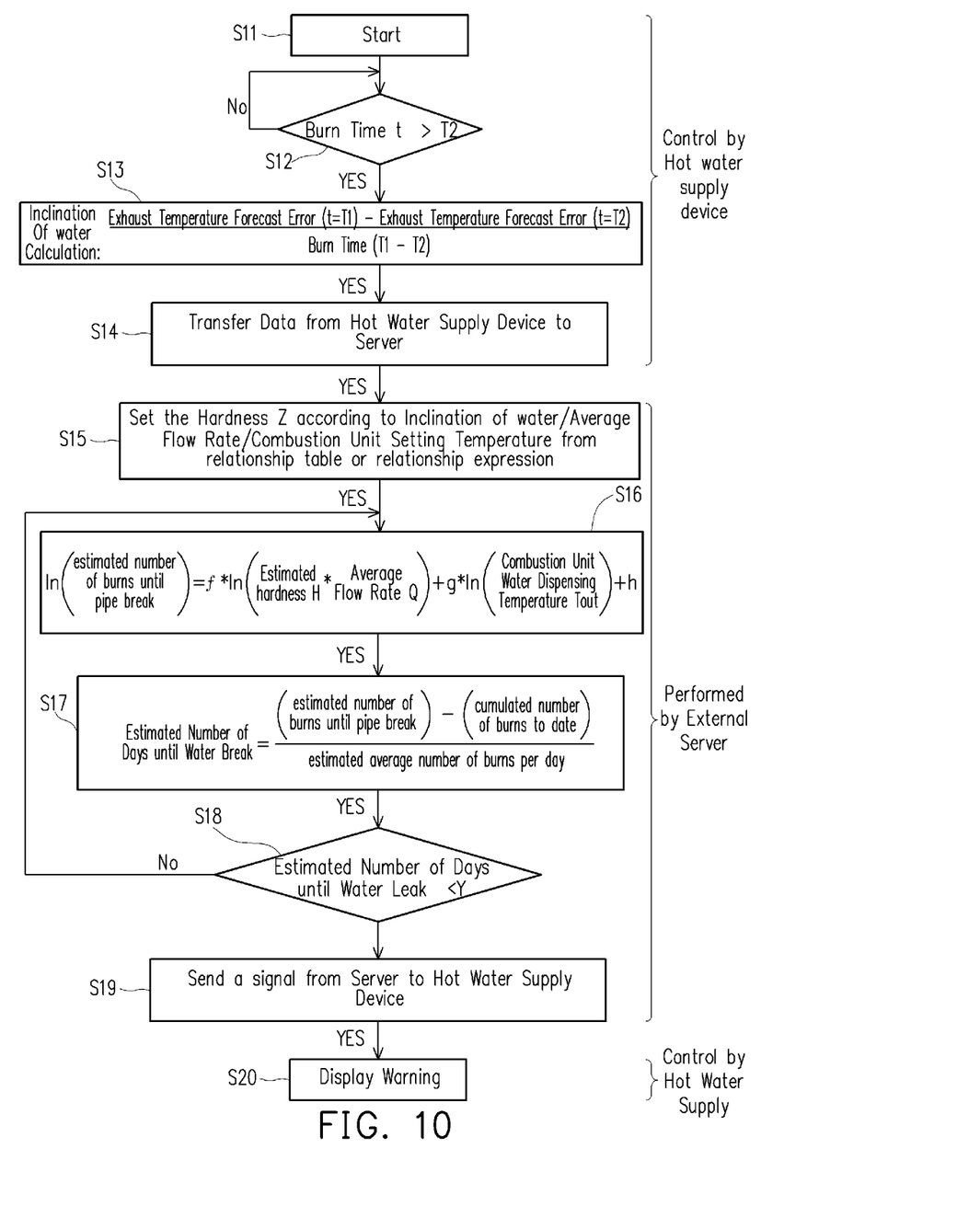
FIG. 10 shows a flow chart illustrating steps for estimating a number of days until pipe water leakage occurs in a hot water supply device by using a processor of the hot water supply device and an external server, according to an embodiment of the disclosure.

FIG. 10 shows a flow chart illustrating steps for estimating a number of days until pipe water leakage occurs in a hot water supply device by using a processor of the hot water supply device and an external server, according to an embodiment of the disclosure. A difference between the embodiment shown in FIG. 9 and the embodiment shown in FIG. 10 is that an external server is involved in the embodiment of FIG. 10. Referring to FIG. 10, steps S11~S13 are similar to steps S1~S3 of FIG. 9 and description will be omitted here.

Next, in step S14, data is transferred from the hot water supply device 100 to an external server. The data transferred to the hot water supply device 100, for example, includes the inclination of water, the average flow rate, and the combustion unit setting temperature.

Next, steps S15~S19 are performed by the external server. In step S15~S17 are similar to steps S4~S6 of FIG. 9 and description will be omitted here. Next in step S18, the estimated number of days until water leak obtained in step S17 is compared to a predetermined value Y. When the estimated number of days until water leak is less than the predetermined value Y, then a signal is sent from the server to the hot water supply device 100. Step S20 is performed by the hot water supply device 100. When the hot water supply device 100 receives the signal from the external server indicating the estimated number of days until water leak is less than the predetermined value Y, a warning is displayed by the hot water supply device 100 in step S20.

In the above FIG. 10, the steps for estimating a number of days until pipe water leakage occurs in a hot water supply device by using a processor of the hot water supply device and the external server was described.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hot water supply device, adapted to generate hot water through heat exchange, the hot water supply device comprising:
   an inlet pipe;
   an outlet pipe;
   a burner unit for combusting a fuel gas to generate heat;
   a heat exchanger comprising a heat exchange tubing, disposed between the inlet pipe and the outlet pipe, and adapted to exchange heat between the fuel gas combusted by the burner unit and water passing through the heat exchanger;
   an exhaust aperture discharging exhaust gas after heat exchange by the heat exchanger;
   a first temperature sensor for detecting a measured exhaust temperature of the exhaust gas;
   a second temperature sensor for detecting a water temperature of water entering the inlet pipe;
   and a processor,
   wherein, in a steady state combustion operation of the hot water supply device, the processor is configured to obtain an error between the measured exhaust temperature and an estimated exhaust temperature, and detects that scale clogging has occurred inside the heat exchange tubing based on an index which is generated using the error between the measured exhaust temperature and the estimated exhaust temperature,
   wherein the estimated exhaust temperature is a first predetermined value that is determined using a numerical equation which has at least the water temperature of water entering the inlet pipe and a scale number of the hot water supply device as variables of the numerical equation,
   wherein the estimated exhaust temperature is calculated by the following formula 2:

$$\begin{bmatrix}\text{Estimated Exhaust}\\\text{Temperature}\end{bmatrix} = a \times \begin{bmatrix}\text{Water temperature}\\\text{of water entering}\\\text{the inlet pipe}\end{bmatrix} + b \times \begin{bmatrix}\text{Scale number of}\\\text{the hot water}\\\text{supply device}\end{bmatrix},$$

wherein the scale number of the hot water supply device in formula 2 is calculated using the water temperature of water entering the inlet pipe,
   and a and b are coefficients that are not zero.

2. A hot water supply device, adapted to generate hot water through heat exchange, the hot water supply device comprising:
   an inlet pipe;
   an outlet pipe;
   a burner unit for combusting a fuel gas to generate heat;
   a heat exchanger comprising a heat exchange tubing, disposed between the inlet pipe and the outlet pipe, and adapted to exchange heat between the fuel gas combusted by the burner unit and water passing through the heat exchanger;
   an exhaust aperture discharging exhaust gas after heat exchange by the heat exchanger;
   a first temperature sensor for detecting a measured exhaust temperature of the exhaust gas;
   a second temperature sensor for detecting a water temperature of water entering the inlet pipe;
   and a processor,
   wherein, in a steady state combustion operation of the hot water supply device, the processor is configured to obtain an error between the measured exhaust temperature and an estimated exhaust temperature, and detects that scale clogging has occurred inside the heat exchange tubing based on an index which is generated using the error between the measured exhaust temperature and the estimated exhaust temperature,
   wherein the estimated exhaust temperature is a first predetermined value that is determined using a numerical equation which has at least the water temperature of water entering the inlet pipe and a scale number of the hot water supply device as variables of the numerical equation,
   wherein the estimated exhaust temperature is calculated by the following formula 5:

$$\begin{bmatrix}\text{Estimated Exhaust}\\\text{Temperature}\end{bmatrix} = c \times \begin{bmatrix}\text{Water temperature}\\\text{of water entering}\\\text{the inlet pipe}\end{bmatrix} +$$
$$d \times \begin{bmatrix}\text{Scale number of}\\\text{the hot water}\\\text{supply device}\end{bmatrix} + e \times \begin{bmatrix}\text{Combustion unit water}\\\text{dispensing Temperature}\end{bmatrix},$$

wherein the scale number of the hot water supply device in formula 5 is calculated using the water temperature of water entering the inlet pipe
   and c, d and e are coefficients that are not zero.

* * * * *